Dec. 23, 1969 H. E. ROYS 3,485,959

TRANSDUCER WITH CURVED SURFACE FOR CARTRIDGE TAPE PLAYER

Filed March 18, 1966 2 Sheets-Sheet 1

INVENTOR.
HENRY E. ROYS
BY
Eugene M. Whitacre
Attorney

TRANSDUCER WITH CURVED SURFACE FOR CARTRIDGE TAPE PLAYER

Filed March 18, 1966 2 Sheets-Sheet 2

INVENTOR.
HENRY E. ROYS
BY Eugene M. Whitacre
Attorney

United States Patent Office 3,485,959
Patented Dec. 23, 1969

3,485,959
TRANSDUCER WITH CURVED SURFACE FOR CARTRIDGE TAPE PLAYER

Henry E. Roys, Indianapolis, Ind., assignor to RCA Corporation, a corporation of Delaware
Filed Mar. 18, 1966, Ser. No. 535,604
Int. Cl. G11b *5/02*
U.S. Cl. 179—100.2 4 Claims

ABSTRACT OF THE DISCLOSURE

A magnetic tape transducer head is affixed to one end of an arm member for arced movement with the arm member in a plane transverse to the direction of tape travel past the head. The surface of the transducer head has a curvature substantially corresponding to an arc of a circle the center of which substantially coincides with the pivot axis of the arm member.

This invention relates generally to magnetic tape recording and reproducing mechanisms and more particularly to an adjustable transducer head assembly for recording and reproducing multiple parallel tracks of a magnetic record medium.

In multiple track magnetic tape recording and reproducing systems it is important that the transducer head be properly aligned with the tape. A quarter inch tape containing, for example, eight tracks of recorded information requires that the tracks be narrow and spaced quite close together. The narrow tracks and close spacing make it necessary that the head and selected tape tracks be precisely aligned in order to minimize crosstalk from th adjacent recorded tracks.

Various mechanisms have been proposed for moving a transducer head mechanically in a direction perpendicular to the direction of motion of the tape. In one such system the head is mounted on a pivot arm and is movable through an arc to change tracks. With such a system it has been observed that as the head moves through the arc, the tape tends to move with it. This results in a misalignment of the head with respect to the selected recorded information track and the introduction of crosstalk in the reproduced signal.

Accordingly it is an object of the present invention to provide an improved transducer head structure and mounting assembly to facilitate continuous proper alignment of the head with selected track portions of a magnetic tape.

It is another object of the present invention to provide an improved transducer head structure and mounting assembly for operation with a tape containing a plurality of tracks of recorded information, which during reproduction, minimizes crosstalk between adjacent channels.

In accordance with the present invention, an arm member is pivotally anchored at one end. A magnetic tape transducer head is affixed to the other end of the arm member for arced movement with the arm member in a plane transverse to the direction of tape travel past the head. The surface of the transducer head over which a magnetic tape from a received cartridge passes has a curvature substantially corresponding to an arc of a circle the center of which substantially coincides with the pivot axis of the arm member.

The novel features which are considered to be characteristic of this invention are set forth with particularity in the appended claims. The invention itself, however, both as to its organization and method of operation as well as additional advantages thereof, will best be understood from the following description when read in conjunction with the accompanying drawings in which:

Figures 1, 2:
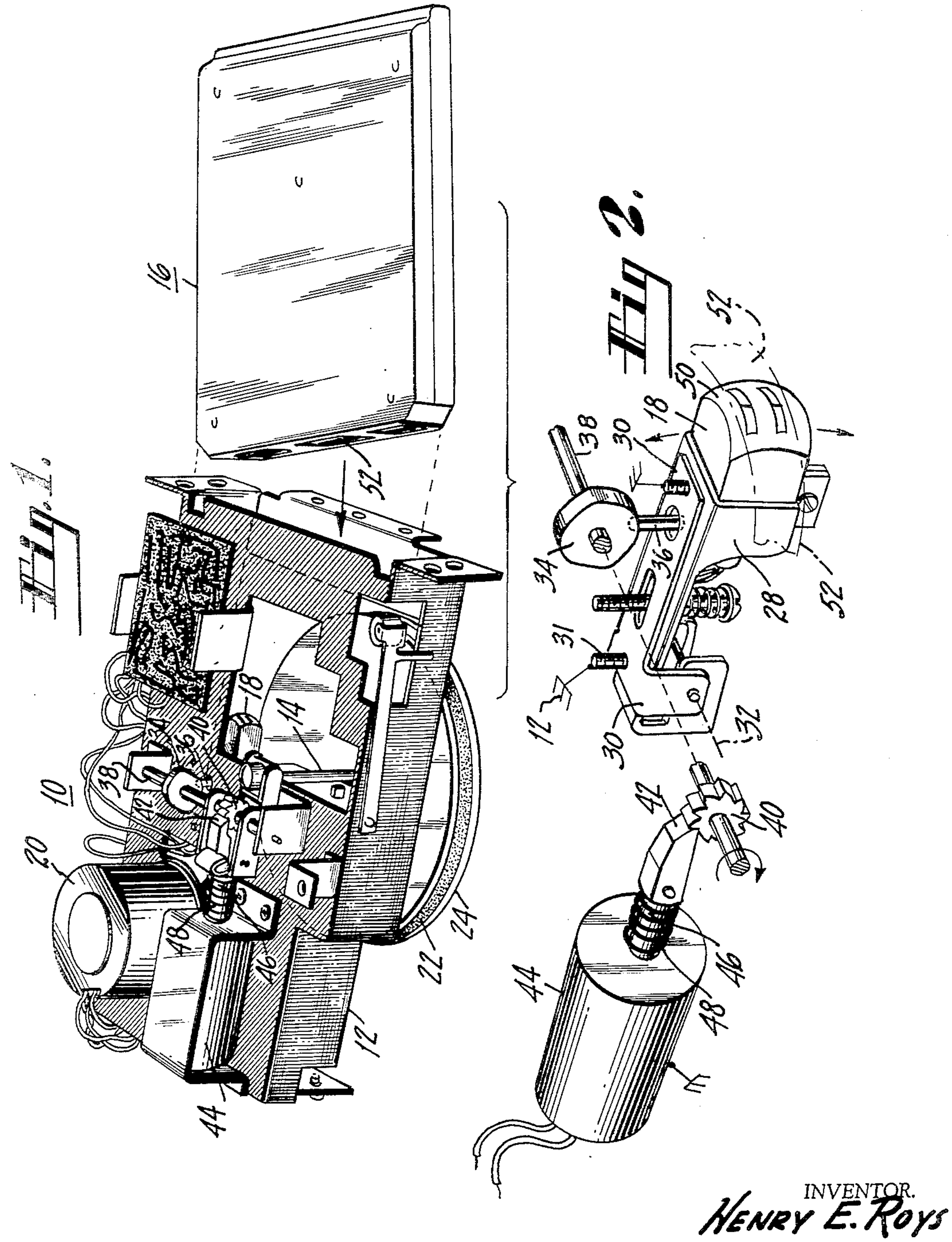
FIGURE 1 is a perspective view of a magnetic tape reproducing mechanism embodying a transducer head assembly of the present invention and also showing a tape cartridge for use in the mechanism shown.
FIGURE 2 is an enlarged perspective view of the transducer head of FIGURE 1 showing its mounting arrangment in the mechanism.

The invention will be explained with reference to a magnetic tape cartridge playback or reproducing apparatus although it will be understood that the invention is equally adaptable for use in recording as well as reproducing apparatus. It will be further understood that the transducer head to be referred to is conventional in nature in so far as its electrical and magnetic characteristics are concerned and may contain one or more magnetic gaps for the transduction of the recorded information. For stereo playback, the head would ordinarily contain two such gaps.

Referring now to the drawing wherein like reference numerals will be used to designate like parts in the several figures, a tape player 10 includes a chassis 12 supporting a rotating capstan 14 to drive the tape contained in a received cartridge 16 past a transducer head 18 to reproduce sound information in a manner known in the art. As is known, the head 18 is slightly rounded with respect to the direction of tape travel to maintain good contact between the tape and the head. The capstan 14 may be suitably driven as, for example, by a motor 20 through a belt 22 and flywheel 24. The capstan 14 is adapted to cooperate with the pinch roller in the cartridge 16 (not shown) when the cartridge is urged into its operating position in the tape player 10. The cartridge 16 also contains a pressure pad (not shown) for pressing the tape against the transducer head 18 for operative contact therewith. Such a cartridge is more particularly shown and described in my copending application, Ser. No. 487,484, filed Sept. 14, 1965, now Patent No. 3,337,150, assigned to Radio Corporation of America.

The electronic circuitry for reproducing the sound information from the magnetic tape may be part of an additional piece of apparatus (not shown) or be mounted on the player chassis, as desired.

A head mounting arm member 28 is carried at the rear of the player apparatus by a U-bracket 30 shown in FIGURE 2. As shown, the arm member 28 is pivotally secured at one end to the U-bracket 30 which is affixed to the chassis 12 of the player apparatus so as to allow for a slight rotational movement of the arm member about its pivot axis 32 in response to a received signal as will be hereinafter described. A screw 31 is provided for adjusting the height of the arm member pivot axis 32 relative to the chassis 12. The transducer head 18 is fixedly secured to the other end of the arm 28 for movement therewith.

A cam 34 is arranged above the am member 28 in cooperative relation to a cam follower 36 secured on the top side of the arm as shown in FIGURE 2. The cam 34 is carried on a shaft 38 for rotation therewith in accordance with the position of a ratchet wheel 40 also carried on the shaft 38.

The teeth in the ratchet wheel are successively engaged in a pawl 42 which is carried on the end of a solenoid 44 activated plunger 46 loaded with a spring 48. In operation, the plunger 46 retracts and advances causing the pawl 42 to engage each of the teeth successively to advance the ratchet wheel 40 through one step for each energization of the solenoid 44. Advancement of the ratchet wheel 40 causes a corresponding rotation of the cam 34 with a resulting arced movement being imparted to the arm member 28 and carried transducer head 18 due to the cooperation of the cam follower 36 with the cam 34.

The surface of the cam 34 which cooperates with the follower 36 is shaped to provide incremental movement of the arm 28 and carried transducer head 18 in response to advancement of the ratchet wheel 40 so as to align the surface 50 of the head 18 for operative engagement with successively selected tracks of a magnetic tape 52 arranged to pass thereover.

A sensing circuit may be employed to energize the solenoid at the end of each tape track, such as, for example, a conductive foil at the end of the tape tracks arranged to electrically connect a pair of spaced contacts which engage the tape thereby to cause energization of the solenoid and advancement of the transducer head into alignment with the next tape track.

Further details of construction of the player apparatus and associated electronic circuitry may correspond to those of Automotive Tape Player, Motorola Model T6SMF manufactured by Motorola, Inc., Franklin Park, Ill.

Using conventional transducing heads, it was observed that when the head is caused to move in its arced path, (transverse to the tape) the tape tends to move laterally with it. The tape has been observed to move as much as 0.01 inch. This results in a misalignment of the head with respect to the selected tape track(s) and the appearance of crosstalk in the reproduced signal.

The importance of this effect will be realized by considering the problems associated with the aforementioned Motorola Automotive Tape Player, a commercially available eight track reproducing system. Each of the tracks are about 0.022 inch wide and are recorded on a tape having a nominal width of 0.246 inch. The spacing between the tracks is about 0.0097 inch. In a stereophonic playback, two tracks (Nos. 1 and 5, 2 and 6, etc.) are reproduced at a time. If the tape does not track the head precisely, crosstalk from adjacent recorded tracks will occur.

Figures 3, 4, 5, 6, 7:
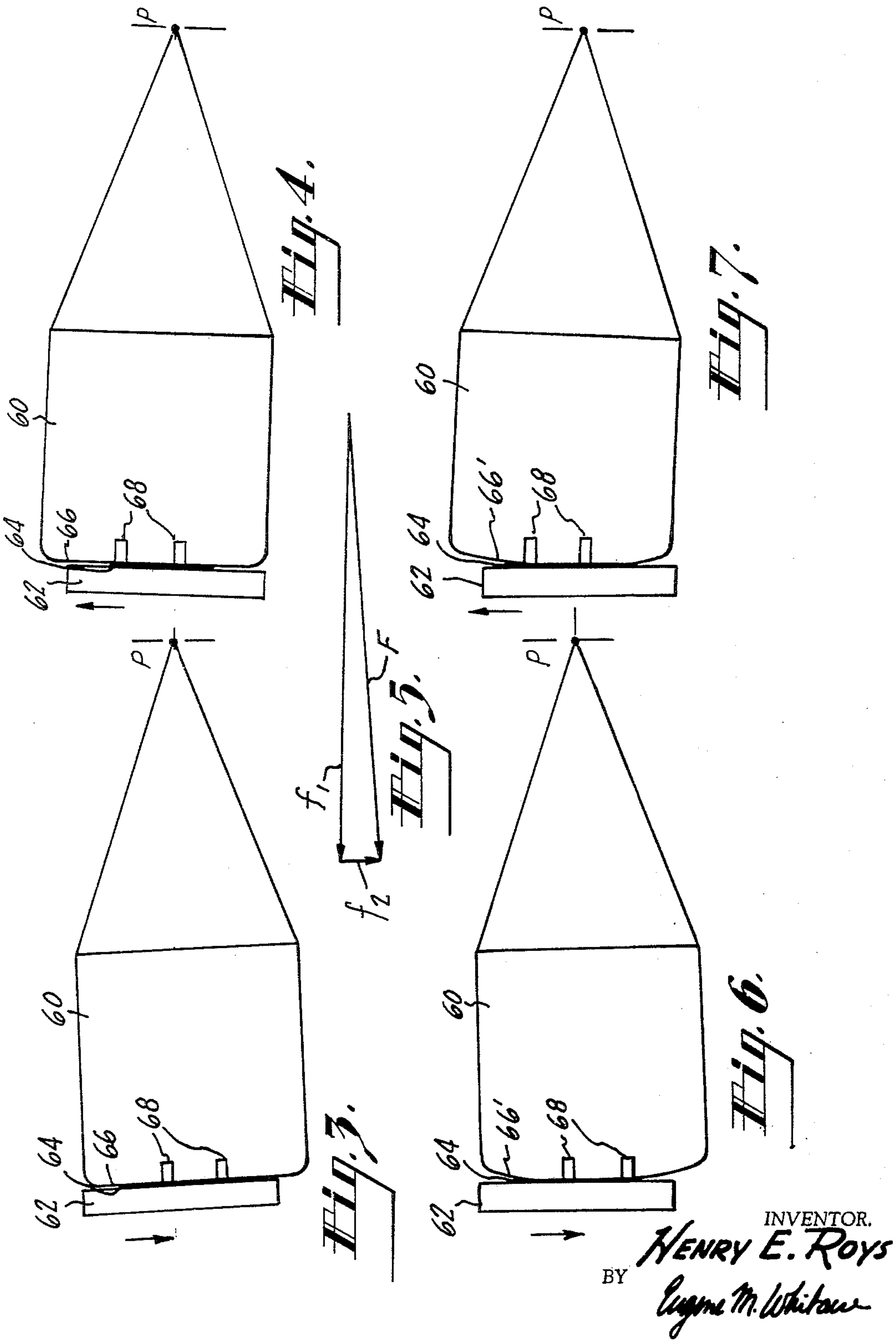
FIGURE 3 is a diagrammatic side view of a prior transducer head pivotally mounted and shown in a first position.
FIGURE 4 is a diagrammatic side view of the transducer head of FIGURE 3 in a second position.
FIGURE 5 is a force diagram believed to apply to the transducer head shown in FIGURE 3.
FIGURE 6 is a diagrammatic side view of a pivotally mounted transducer head modified in accordance with the present invention and shown in a position corresponding to that of FIGURE 3.
FIGURE 7 is a diagrammatic side view of a pivotally mounted transducer head modified in accordance with the present invention and shown in a position corresponding to that of FIGURE 4.

For an understanding of the cause of this undesired lateral tape movement, reference is now made to FIGURES 3 and 4 which show diagrammatic side views of a conventional pivotally arranged stereo transducer head 60 in its down and up postiions respectively. These positions are illustrative of the positions of the head 60 while translating different ones of the parallel tape tracks. A pad 62, such as that which may be mounted in a magnetic tape cartridge, is shown pressing against a moving magnetic tape 64 to urge it into operative contact with the surface 66 of the head 60. It will be noted that the surface 66 of the head 60 is flat with respect to the pivotal point P, as is the case with conventional type transducer heads.

FIGURE 5 is a force diagram which is believed to apply to FIGURE 3 and shows the forces exerted by the head 60 on the tape 64. F is the total force applied by the head 60 normal to its surface 66 on the tape 64. The force F may be resolved into two components:

$f_1$, the horizontal force; and
$f_2$, the force perpendicular to $f_1$.

It has been observed that this latter force, $f_2$, tends to force the tape down. If F equals 15 grams, for example, $f_2$ would be about 0.4 gram, which relatively speaking is a very small force. However, since during player operation, the cartridge tape is moving, very little frictional restraining force of the tape 64 against the pressure pad 62 and/or head surface 66 exists, so that the tape slides downward (under the influence of $f_2$) and no longer maintains the precise alignment desired with the head cores 68. If the pad 62 is wide enough to overlap the tape boundaries and bend inward so as to be indented by the tape, there may be an indentation force applied to the tape to tend to keep it in position. However, since the tape is moving, it will still yield to the force $f_2$ and slide downwardly to a new equilibrium position. It is believed that the same action would occur if the pressure pad 62 were not used and tape tension was the only means used to maintain contact with the head. In FIGURE 4, the tape 66 would be subjected to a similar force component that would force the tape upward.

To alleviate the aforementioned problem and in accordance with the present invention, the contact surface 50 of the transducer head 18 (FIGURE 2) is convexly shaped with respect to the pivot axis 32 of the arm member 28 and in the direction of its arced movement with a radius of curvature substantially equal to the distance between the head surface 50 and pivot axis 32 of the arm member 28. In other words, in the direction of arm movement, the curvature of the head surface 50 substantially corresponds to an arc of a circle the center of which substantially coincides with the pivot axis 32 of the arm member 28.

A diagrammatic side view of a pivotally arranged stereo transducer head having a tape contact surface shaped in accordance with the present invention as shown in first and second positions in FIGURES 6 and 7, respectively. For ease of comparison, the identification nomenclature of FIGURES 3 and 4 are used in FIGURES 6 and 7. From an inspection of FIGURES 6 and 7 it will be seen that, due to the radius of the head contacting surface 66′, the total force F normal to the head surface 66′ applied on the tape 64 is also the total horizontal force $f_1$ and hence no vertical force $f_2$ exists.

Using a transducer head with its tape contacting surface contoured as just described in a tape player wherein the head is pivotally mounted to move through an arc in a direction perpendicular to that of tape travel, it has been observed that there is no tendency of the tape to shift in position when the head is moved, and that there is a significant decrease in the crosstalk from the adjacent tape tracks over that observed using a conventionally shaped head.

What is claimed is:

1. A transducer head assembly for a magnetic tape record system of the type including a reeling mechanism for driving a magnetic tape over the surface of a magnetic tape transducer head comprising in combination:

a magnetic tape transducer head having a tape engaging surface;

pivotally mounted support means for said transducer head to move said transducer head in an arcuate path transverse to the direction of tape travel;

said transducer head surface having a curvature in a direction normal to the direction of tape travel substantially corresponding to an arc of a circle the center of which substantially coincides with the pivot axis of said support means; and a substantially flat pressure pad for urging said magnetic tape against said transducer head tape engaging surface.

2. A transducer head assembly as defined in claim 1 wherein said magnetic tape includes a plurality of equally spaced parallel record tracks and including means for moving said support member in discrete steps by an amount so that the surface of said transducer head is moved a distance corresponding to the distance between adjoining tracks.

3. A transducer head assembly for a tape player of the type adapted to receive a cartridge containing a magnetic tape exposed for passage across and in contact with a surface of said head comprising in combination:

a support structure within said tape player;

an arm pivotally anchored at one end to said support structure for arcuate movement in a plane transverse to the direction of tape travel in said received cartridge;

a transducer head affixed to the other end of said arm and movable therewith, said transducer head having a surface over which the tape passes, said surface being convexly curved with respect to the pivot axis of said arm both in the direction of tape travel and in the direction of the arcuate movement of said arm, the curvature of said surface in the direction of arcuate arm movement substantially corresponding to an arc of a circle the center of which substantially coincides with the pivot axis of said arm; and a substantially flat pressure pad for urging said magnetic tape against said transducer head tape engaging surface.

4. A transducer head assembly as defined in claim 3 wherein said magnetic tape includes a plurality of recording tracks and includes:

a cam member moveably mounted on said support structure;

a cam follower coupled between said cam member and said arm for selectively positioning said transducer head in its path of arcuate movement as a function of the position of said cam member; and means for moving said cam member between a series of selected positions thereby to cause said transducer head to operably align itself with selected ones of said tape tracks.

References Cited

UNITED STATES PATENTS

| | | | |
|---|---|---|---|
| 3,170,031 | 2/1965 | Okamura | 179—100.2 |
| 2,751,274 | 6/1956 | Andrews | 179—100.2 |
| 3,219,990 | 11/1965 | Goehle | 340—174.1 |
| 3,370,131 | 2/1968 | Reed | 179—100.2 |

BERNARD KONICK, Primary Examiner

J. R. GOUDEAU, Assistant Examiner

U.S. Cl. X.R.

274—4;340—174.1